United States Patent Office 3,091,976
Patented June 4, 1963

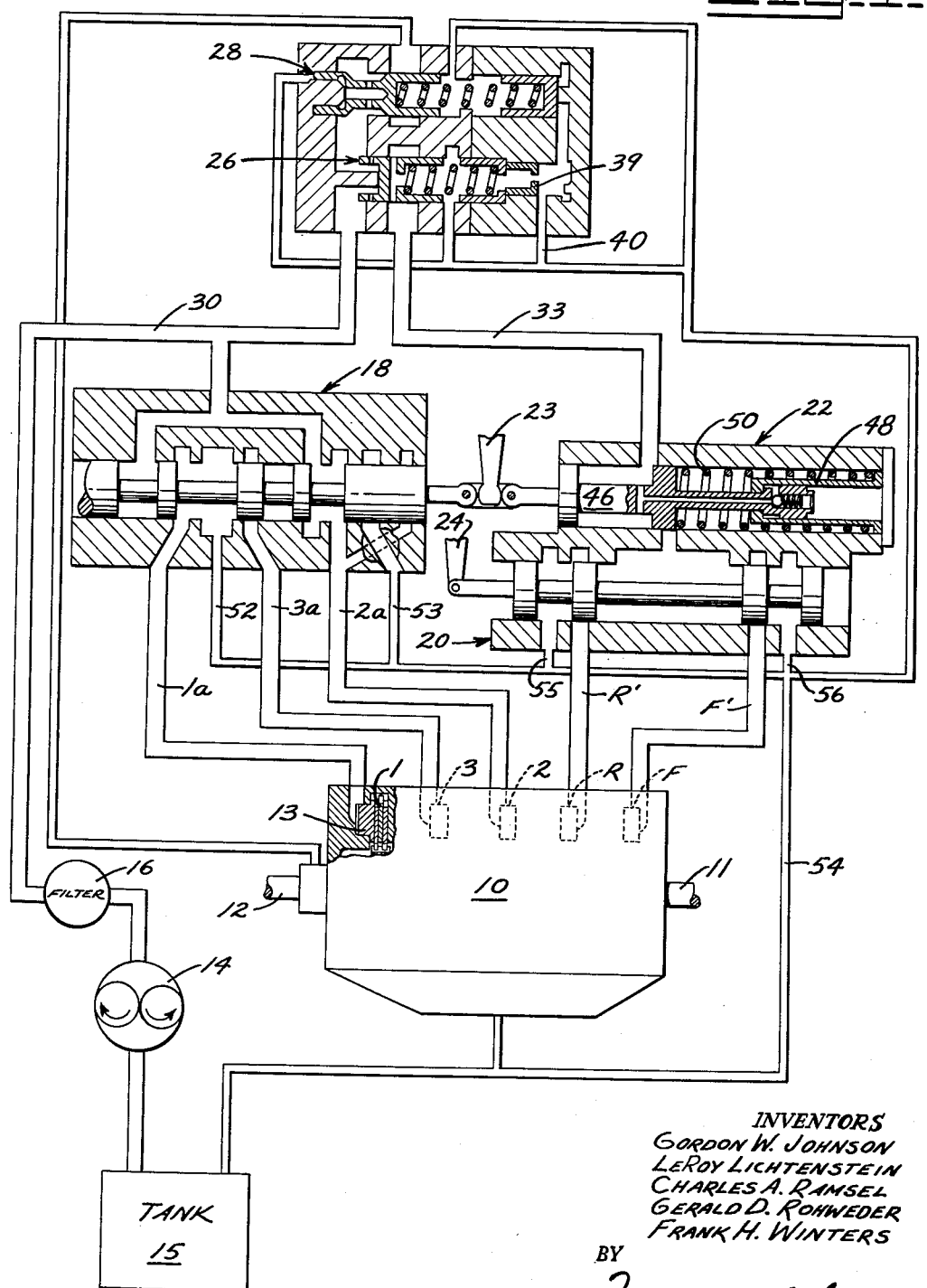

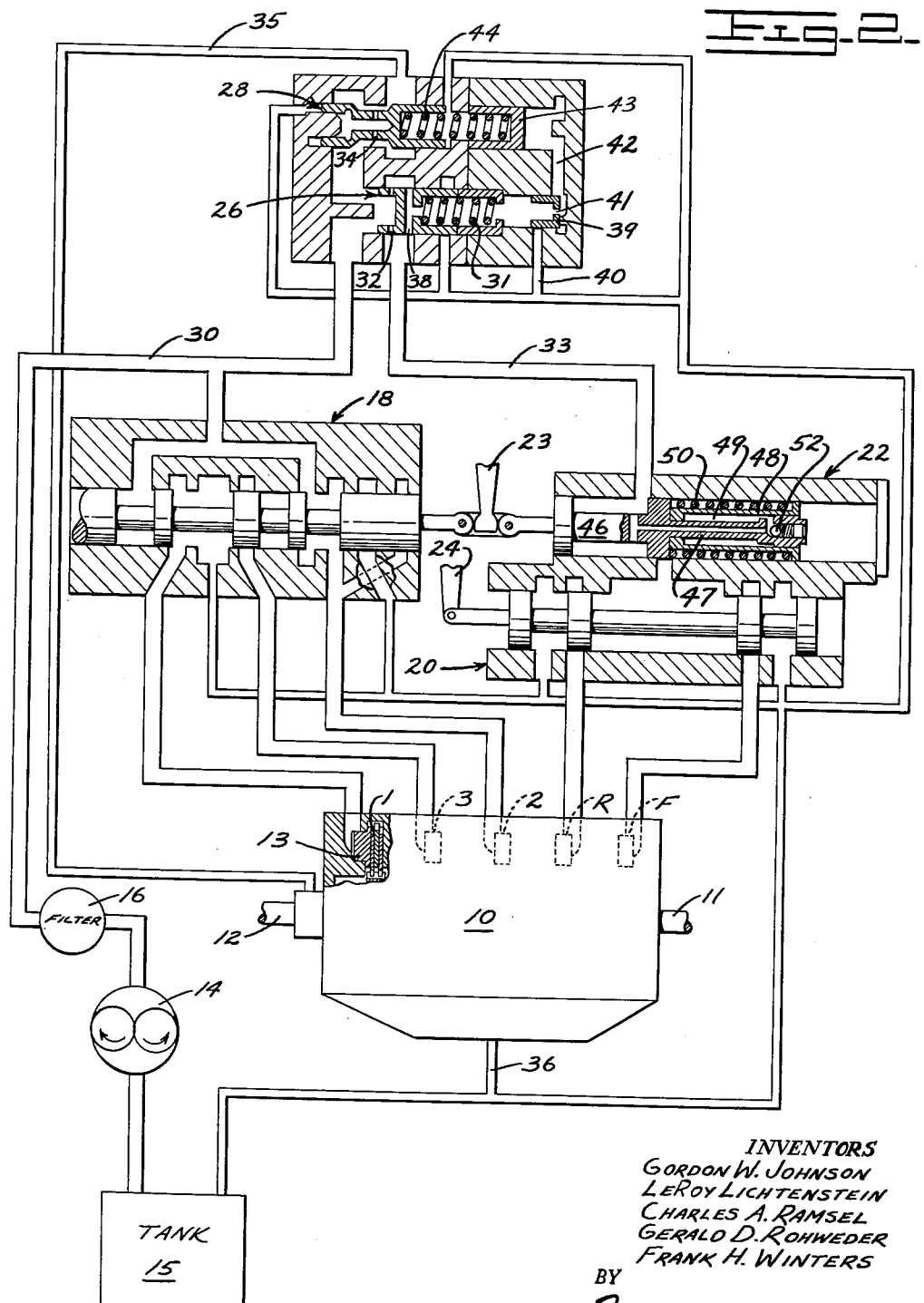

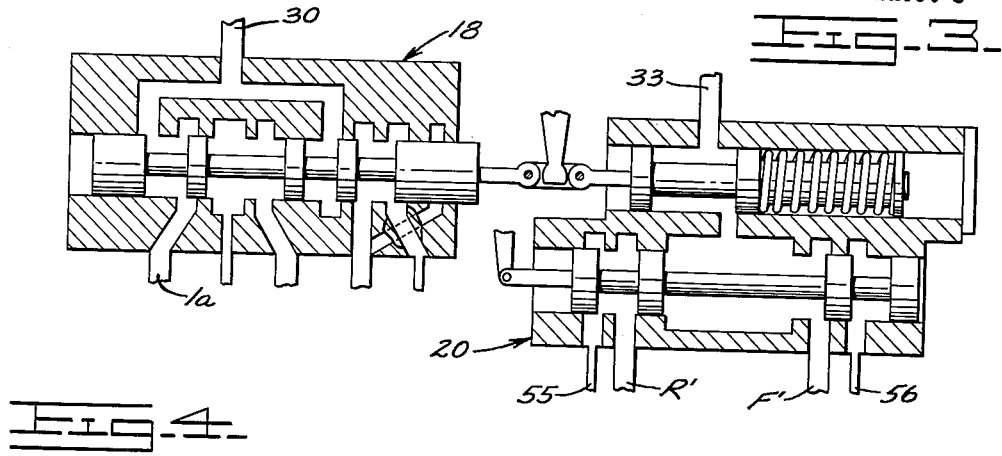
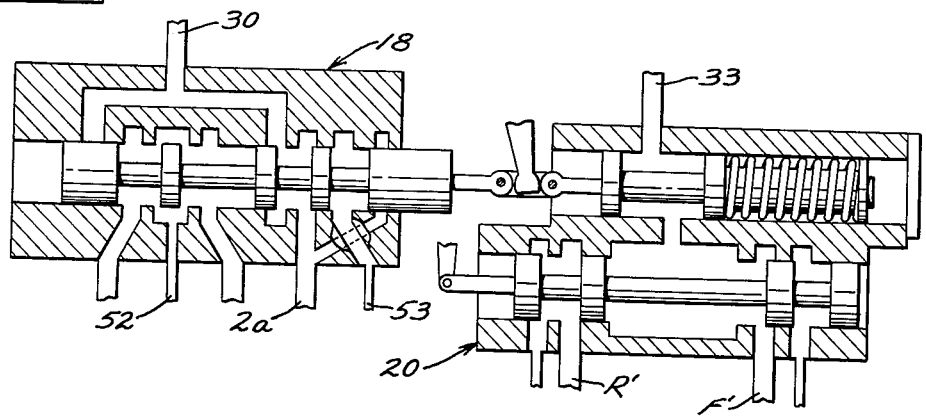
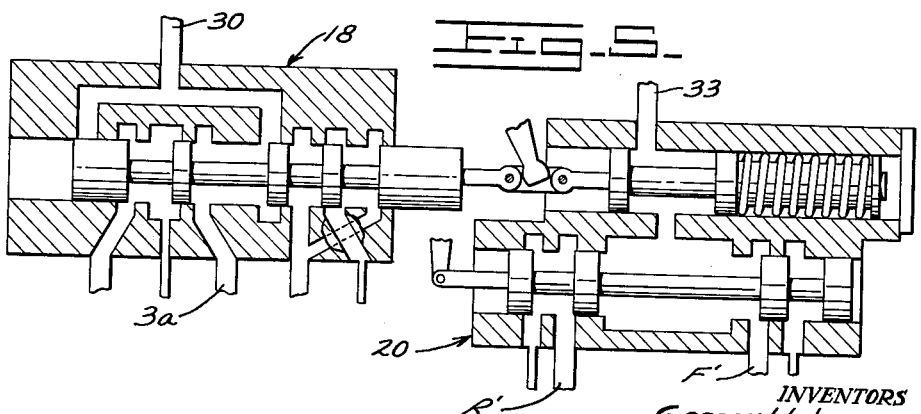

3,091,976
HYDRAULIC CONTROLS FOR POWER TRANSMISSION
Gordon W. Johnson, Peoria, LeRoy Lichtenstein, Morton, and Charles A. Ramsel, Gerald D. Rohweder, and Frank H. Winters, Peoria, Ill., assignors to Caterpillar Tractor Co., Peoria, Ill., a corporation of California
Filed Apr. 28, 1959, Ser. No. 809,535
5 Claims. (Cl. 74—364)

This invention relates to hydraulic control means for effecting shifting of a vehicle transmission of the type in which shifting is accomplished by hydraulic pressure applied in the transmission itself.

The invention is directed particularly to control means for a transmission of the type disclosed in the application for United States Letters Patent of Robert O. Chambers et al., for "Planetary Transmission for Tractors or the Like," Serial No. 800,286, filed Mar. 18, 1959, now Patent No. 3,021,729, issued February 20, 1962. The transmission therein disclosed is of the planetary type wherein the selection of any particular gear ratio through the transmission is effected by stopping the rotation of a normally rotating ring gear or carrier of an epicyclic gear train. This is accomplished by a disc-type brake actuated by the application of hydraulic pressure. This type of transmission may be shifted under full load with a minimum torque loss as the brakes act in the manner of friction clutches which may be engaged and disengaged gradually without the necessity of employing a main clutch, as is customary in ordinary gear-type transmissions. This particular transmission includes three selectable speeds or gear trains of different ratios and a forward and reverse drive also selectable by disc-type brakes and either of which is operable in combination with any one of the three speed trains. It is necessary, therefore, that both a speed ratio and a direction (forward or reverse) be selected and the respective brakes both engaged to impart a drive to the vehicle. Since at least one of the brakes applied acts in the manner of a main clutch to absorb through friction, the shock of transmitting power through the drive shaft of the vehicle, the forward and reverse brakes have been selected for this purpose and may be of superior or more durable construction thus avoiding excessive wear on the several speed selecting brakes.

It is an object of the present invention to provide hydraulic controls for a transmission of the kind described having speed ratio trains and direction trains in which pressure is applied automatically to first a selected speed train and then to a direction train.

A further object is to provide controls for actuating a transmission through the direct application of hydraulic pressure rather than through complex servo systems.

A further object is to provide means for modulating or gradually increasing pressure as it is applied to a selective train in the transmission.

A still further object of the invention is to prevent the application of pressure to either the forward or reverse gear train of a transmission of the kind described above until one of the speed ratio trains has been selected and also to prevent actuation of controls which direct pressure to the forward or reverse trains before the engine of the vehicle is in operation to insure that the transmission is out of gear when the engine is started.

Another object is to provide an improved circuit with a minimum of valving not sensitive to minor changes in hydraulic fluid viscosity and capable of effecting smooth, consistent transmission shifting.

Still further objects and advantages of the invention and the manner in which it is carried into practice are made apparent in the following specification wherein the invention is described in detail by reference to the accompanying drawings.

In the drawings:
FIG. 1 is a schematic circuit diagram of hydraulic transmission controls embodying the present invention in a neutral or shut-down condition;
FIG. 2 is a view similar to FIG. 1 but showing the position of the parts assumed when the vehicle engine has been started and pressure introduced to the system; and
FIGS. 3, 4, and 5 are views of the manually controlled speed train selecting and direction train selecting valves illustrating the positions which they assume for first, second and third speeds forward, respectively.

In FIGS. 1 and 2 of the drawings, a planetary type transmission is schematically illustrated at 10 as having input and output shafts 11 and 12, respectively, and as having first, second and third speed gear train brakes indicated at 1, 2, and 3 adapted to be selected for transmission of power from the input to the output shafts by the application of disc-type brakes indicated at 1, 2 and 3, respectively, for first, second and third speeds and similar brakes R and F for reverse and forward directions, respectively. A complete disclosure of a transmission of this kind may be found in the copending application referred to hereinabove but it is sufficient to an understanding of the controls of the present invention to know that the brakes may be selectively applied by the application of pressure in each case to an annular piston, one of which is illustrated at 13.

In practice, a pump 14 driven by the engine of a vehicle, not shown, of which the transmission 10 is a part, delivers a hydraulic fluid such as lubricating oil from a tank 15 and through a conventional filter 16 to the control system. The system includes a spool-type selector valve, generally indicated at 18, for controlling the direction of pressure to the speed train brakes 1, 2 and 3 and a spool-type valve 20 for controlling the direction of pressure to the forward and reverse or direction brakes F and R. An interlock or safety valve 22, the housing of which may be common with that of the valve 20, is provided to prevent actuation of the forward or reverse brake until after a speed train brake has been selected as well as when the pump 14 is not in operation. The valves 18 and 22 are manually controlled by a shifting cane, a portion of which is illustrated at 23 which may be manipulated to select any one of the several speeds. The valve 20 is manually controlled through a forward and reverse cane, a portion of which is shown 24 as being connected with the valve spool.

A valve, generally indicated at 26, is employed to delay the application of pressure to the forward and reverse brakes until after one of the speed brakes has been engaged and a valve 28 which will be referred to as a modulating valve preferably in the same housing with the valve 26 is employed to gradually increase the pressure of fluid directed to any of the brakes to regulate the speed at which they are applied and thereby insure smoothness of operation in starting or shifting gears.

In FIG. 2 of the drawings, the system is illustrated with the parts in the positions which they assume when the pump 14 is in operation and the controls are in neutral. Operation of the pump introduces fluid under pressure to a line 30 and through valve 18 to brake 2. When the cylinder of brake 2 is filled, the pressure in line 30 increases and opens valve 26 against the pressure of its spring 31 with the result that fluid is metered through orifices 32 in valve 26 to a line 33 leading to the valves 22 and 20, the former of which is presently in a closed position preventing flow of fluid to the forward and reverse brakes to maintain the transmission in neutral. Upon filling of line 33, the pressure in line 30 rises and opens modulating valve 28 by entering its hollow spool through orifices 34 therein to bypass fluid from the line 30 through a line 35 to the transmission 10 for lubricating purposes. The flow of lubricating fluid to the transmission is collected in the sump or bottom portion of the transmission case and returned as by a drain line 36 to the tank 15.

Meanwhile, fluid entering the line 33 through valve 26 flows through a passage 38 and through the spring chamber of valve 26 to move a floating check valve spool 39 endwise to the position shown in FIG. 2 where it blocks a normally open drain passage communicating through a line 40 and connecting lines as shown with the tank 15. A restricted orifice 41 in the spool 39 meters fluid into and through a passage 42 connecting with the bore of the valve 28 behind a piston 43 therein which acts as a seat for the valve spring 44. This effects gradual compression of the spring 44 increasing the force necessary to maintain the valve 28 open and thereby gradually increasing the pressure in the line 30 to insure smooth engagement of any brake to be selected in a manner presently to be described. This modulation of pressure by increasing the effective force of the spring 44 enables the use of a relatively weak spring 44 to function during initial opening of the modulating valve while at the same time providing the total necessary spring force to build up the pressure for final engagement of the brake.

The orifices 32 are sufficiently small to provide a pressure differential between lines 30 and 33 so that the increasing high pressure in line 30 will effect engagement of the selected speed brake prior to engagement of the selected forward or reverse brake. This sequence of brake engagement insures that any slippage of the brakes developed in transfer of the load through the transmission is limited to either the forward or reverse brake, thus minimizing the wear on the first, second and third speed brakes. Furthermore, this pressure differential insures opening of the valve 28 prior to engagement of the forward or reverse brake so that any valve chatter which sometimes occurs in this type of valve will not effect the engagement of the brake which is picking up the load.

In the neutral position with the pump 14 operating which has just been described, the safety or interlocked valve 22 is held in the position shown in FIG. 2 with its spool 46 blocking the flow of fluid to the forward and reverse brakes. The spool 46 has a tubular extension 47 with a sleeve 48 telescoping thereover to provide an intermediate chamber 49. Normally, without pressure in the system as when the pump is not operating, or in the event of breakage or other pressure failure in line 33, a spring 50 interposed between the spool 46 and sleeve 48 urges the sleeve to an extended position where it abuts the end of the valve bore as illustrated in FIG. 1, forcing the spool to its closed position and also forcing the spool valve 18 to the FIG. 1 or neutral position to insure that the transmission is out of gear when the engine of the vehicle is started. To prevent rapid discharge of the fluid from the chamber 49 and extension of the sleeve 48 to the FIG. 1 position during the momentary pressure drop during shifting from one speed to another, a spring loaded ball check valve 52 closes the tubular extension 47. The sleeve 48 is loosely fitted in its telescoping relationship with the tubular member 47 so that upon any continuing failure of pressure such as when the engine of the vehicle is shut down, fluid escapes from the chamber 49 between the loosely fitted parts in a few seconds' time.

The positions of the manually adjustable valves 18 and 20 for first, second and third speeds forward are illustrated in FIGS. 3, 4 and 5. First speed is obtained as shown in FIG. 3 where the spool of valve 18 is moved a short distance toward the right so that pressure from line 30 is communicated through the valve and through a line 1A to apply the brake 1. Further rightward movement of the spool in valve 18 results in the position shown in FIG. 4 and the direction of fluid under pressure through the valve and a line 2A to effect application of brake 2. Still further movement to the right results in the position shown in FIG. 5 with pressure directed through the valve and the line 3A to brake 3. In each of the several positions shown in FIGS. 3, 4 and 5, those portions not under pressure are drained through lines 52 and 53 which communicate with a main drain line 54 leading to the tank 15.

In the forward speeds described, the control valve 20 is shown as directing pressure from the line 33 to a line F' communicating with the forward brake F. To effect reverse drive, the spool of valve 20 is moved toward the left as viewed in the drawings to a position where the pressure from line 33 will be directed to line R' and the pressure will be applied to the reverse brake R. Suitable drain lines 55 and 56 in the valve 20 also communicate with the main drain line 54.

While the transmission is operating at any of the speeds described, the positions of the parts in the valves 26 and 28 are as shown in FIG. 2 but during the momentary pressure drop occasioned by shifting from one speed to another while pressure in the line 30 falls off for the time required to fill the lines leading to another brake, the parts in the valves 26 and 28 will return to the positions illustrated in FIG. 1. During this return, the floating valve 39 is moved to the left by the force of fluid expelled by the piston 43 under influence of the spring 44. Thus, drain line 40 is opened permitting quick escape of the fluid behind the piston 43. This insures smooth consistent shifting each time a change of speed is made because the modulated pressure rise must take place to effect engagement of the newly selected speed train brake in the transmission.

We claim:

1. In controls for a transmission having a plurality of speed ratio trains and forward and reverse direction trains, wherein a separate actuator controls each train and a fluid motor is employed to energize each actuator, a source of fluid under pressure, and means to direct pressure from said source selectively to said fluid motors and thereby to select the trains to be employed for transmission of power, the improvement which comprises, a first selector valve in said pressure directing means associated with the speed ratio trains, a second selector valve associated with the direction trains, and means to prevent application of pressure through said second selector valve until pressure has reached the fluid motor of a speed ratio train.

2. In controls for a transmission having a plurality of speed ratio trains and forward and reverse direction trains, wherein a separate actuator controls each train and a fluid motor is employed to energize each actuator, a source of fluid under pressure, and means to direct pressure from said source selectively to said fluid motors and thereby to select the trains to be employed for transmission of power, the improvement which comprises, a first selector valve in said pressure directing means associated with the speed ratio trains, a second selector valve associated with the direction trains, and means to prevent application of pressure through said second selector valve until pressure has reached the fluid motor of a speed ratio train, and a modulating valve to effect a gradual increase in pressure at said fluid motors.

3. In controls for a transmission having a plurality of speed ratio trains and forward and reverse direction trains, wherein a separate actuator controls each train and a fluid motor is employed to energize each actuator, a source of fluid under pressure, and means to direct pressure from said source selectively to said fluid motors and thereby to select the trains to be employed for transmission of power, the improvement which comprises, a first selector valve in said pressure directing means associated with the speed ratio trains, a second selector valve associated with the direction trains, means to prevent application of pressure through said second selector valve until pressure has reached the fluid motor of a speed ratio train, and a modulating valve to effect a gradual increase in pressure at said fluid motors, said last means comprising a spring closed valve, and means to open the spring closed valve with fluid pressure which builds up in the system after pressure has been directed to the first selector valve.

4. In a transmission for an engine powered vehicle which has a plurality of speed ratio trains and forward and reverse direction trains, a separate actuator to control each train, a fluid motor to energize each actuator, a source of fluid under pressure derived from a pump actuated by the vehicle engine, and means to direct pressure from said source selectively to said fluid motors and thereby to select the trains to be employed for the transmission of power, the improvement which comprises, a first selector valve in said pressure directing means associated with the speed ratio trains, a second selector valve associated with the direction trains, a spring biased valve normally preventing flow through the second selector valve when the vehicle engine and pump are not operating to insure that the transmission is out of gear when the engine is started, and means actuated by pressure from the pump to open said spring biased valve.

5. In a transmission for an engine powered vehicle which has a plurality of speed ratio trains and forward and reverse direction trains, a separate actuator to control each train, a fluid motor to energize each actuator, a source of fluid under pressure derived from a pump actuated by the vehicle engine, means to direct pressure from said source selectively to said fluid motors and thereby to select the trains to be employed for the transmission of power, the improvement which comprises, a first selector valve in said pressure directing means associated with the speed ratio trains, a second selector valve associated with the direction trains, a spring biased valve normally preventing flow through the second selector valve when the vehicle engine and pump are not operating to insure that the transmission is out of gear when the engine is started, means actuated by pressure from the pump to open said spring biased valve, a pressure chamber retaining pressure to hold the spring biased valve open, and means to effect gradual release of pressure from said chamber to prevent closing of the valve in the event of momentary pressure drops in the control system.

References Cited in the file of this patent

UNITED STATES PATENTS

| | | |
|---|---|---|
| 2,756,616 | Forster | July 31, 1956 |
| 2,761,328 | Herndon et al. | Sept. 4, 1956 |
| 2,766,639 | Rosenberger | Oct. 16, 1956 |
| 2,835,136 | Berthiez | May 20, 1958 |
| 2,843,213 | Schwartz | July 15, 1958 |
| 2,887,198 | Hobbs | May 19, 1959 |
| 2,917,936 | Fletcher | Dec. 22, 1959 |
| 2,943,500 | Wittren | July 5, 1960 |